(12) United States Patent  
Cooper

(10) Patent No.: US 6,441,903 B1  
(45) Date of Patent: Aug. 27, 2002

(54) OPTICAL SENSOR FOR ILLUMINATION MIXTURES AND METHOD FOR THE DESIGN THEREOF

(75) Inventor: Ted J. Cooper, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/290,357

(22) Filed: Apr. 12, 1999

(51) Int. Cl.[7] .............................. G01N 21/25; G01J 3/46
(52) U.S. Cl. .................... 356/405; 356/406; 356/425
(58) Field of Search ....................... 356/402, 405, 356/406, 423, 425, 416

(56) References Cited

U.S. PATENT DOCUMENTS

| | | | |
|---|---|---|---|
| 3,973,118 A | 8/1976 | LaMontagne | 250/226 |
| 4,079,388 A | 3/1978 | Takahama et al. | 354/31 |
| 4,308,456 A | 12/1981 | Van Der Gaag et al. | 250/226 |
| 4,379,292 A | 4/1983 | Minato et al. | 345/154 |
| 4,386,345 A | 5/1983 | Narveson et al. | 345/22 |
| 4,653,925 A | 3/1987 | Thornton, Jr. | 356/419 |
| 4,708,108 A | 11/1987 | Kumagal et al. | 348/178 |
| 4,896,965 A | 1/1990 | Goff et al. | 356/417 |
| 4,952,917 A | 8/1990 | Yabuuchi | 345/147 |
| 5,272,518 A | 12/1993 | Vincent | 356/405 |
| 5,500,709 A | 3/1996 | Kazami et al. | 354/416 |
| 5,512,981 A | 4/1996 | Cappels, Sr. | 348/658 |
| 5,526,058 A | 6/1996 | Sano et al. | 348/647 |
| 5,568,267 A * | 10/1996 | Sumamori et al. | 356/416 |
| 5,710,948 A | 1/1998 | Takagi | 396/50 |
| 5,799,216 A | 8/1998 | Teremy et al. | 396/225 |
| 6,081,254 A | 6/2000 | Tanaka et al. | 345/154 |
| 6,215,962 B1 | 4/2001 | Cooper | 396/225 |

\* cited by examiner

*Primary Examiner*—F. L. Evans
*Assistant Examiner*—Zandra V. Smith
(74) *Attorney, Agent, or Firm*—Mikio Ishimaru

(57) ABSTRACT

An optical sensor system is provided which provides portions of the intensity spectrum of various types of natural and artificial light and combinations thereof. The illumination passes through a series of band pass filters or through a diffraction grating to be sensed by a plurality of photosensors sensing different portions of the spectrum. The photosensors are connected to a processing system which can determine the nature of the illuminants from characteristic areas of the intensity spectrum falling on the photosensors.

17 Claims, 6 Drawing Sheets

OPTICAL SENSOR FOR ILLUMINATION MIXTURES AND METHOD FOR THE DESIGN THEREOF

CROSS-REFERENCE TO RELATED APPLICATIONS

The present application contains subject matter related to concurrently filed U.S. Patent Applications by Ted J. Cooper entitled "ILLUMINATION DETECTING CAMERA", "SCANNING AND PRINTING SYSTEMS WITH COLOR DISCRIMINATION", and "COLOR CORRECTING AND AMBIENT LIGHT RESPONSIVE CRT SYSTEM". The related applications are also assigned to the same assignees as the present application and are identified by Ser. Nos. 09/290,507, 09/290,148, and 09/290,461, respectively.

TECHNICAL FIELD

The present invention relates generally to optical sensor systems and more particularly to an optical sensor system capable of distinguishing between different illuminants.

BACKGROUND ART

The human vision system is a very poorly understood mechanism that translates photons of various wavelengths into visual pictures that human brains can understand and respond to. The human vision system and mental system compensate for scenes under various illumination sources and provides to the viewer a "corrected" visual picture. For example, white tee shirts appear white in human vision regardless of whether the scene happened under noonday sunlight or in the last minutes of a red sunset. When digital cameras, either video motion cameras (VMC) or a digital still camera (DSC), are exposed to similar illumination environments, the resulting images are profoundly different.

Extensive research has been undertaken to predict a mathematical construct for an image called the White Point (WP). The WP is the illumination that occurred at the brightest point in the image and represents what should be considered "white" in the final image. It is assumed that every image has some white objects or highlights in it. When the brightest object, with roughly equal amounts of red, green, and blue is located, the WP operation is constructed by determining the multipliers of the red, green, and blue parts of the brightest point so that the resulting red, green, and blue values will be made equal. Once this transformation is known for the brightest point in an image, it is simultaneously applied to all the other points (which are called pixels) in the image. The WP operation typically results in a final image that looks much more realistic with respect to its color balance.

There is a significant shortcoming of the simplistic WP operation described above. It is the assumption that there are some spectrally "white" objects in the image. While this is true the majority of the time for typical "tourist" pictures, there are also numerous cases where a spectrally "white" object is not present. For example, a close-up picture of a red barn with some blue and green metal signs attached to the barn's side. The dominant color would be red. Some digital camera systems might interpret the large amount of red as a color cast problem that typically occurs under sunset illumination conditions. The brightest part of the image would be the green signs. If the digital camera algorithm attempted to use the green area as the WIP, then the resulting picture would be made very blue. The underlying problem is caused by not knowing the true nature of the illumination (light source) present at the time the image was captured.

Current technology tries to use the color content of the image to estimate the color illumination. In video motion cameras (VMCs), there has been remarkable success with this method since the videographer typically "pans" a scene to cover a large area. In this process, there is almost always some bright white object that can be identified in the multiple images. Once this "brightest" object is imaged, the WP algorithm locks in on this area and makes a prudent estimate of the white point illumination and keeps this WP value until a "brighter" white object is discovered. This is not true for digital still cameras (DSCs) where typically only a single image is capture for a given scene.

A great deal of research is being conducted to see if the WVv of an image can be deduced from just the image itself. However, examples like the barn picture described above will always cause problems. An alternative solution is to measure the scene's illumination source directly. In black and white photography, the measurement was performed with a "light meter". The meter is pointed at the light source, which would be straight up for daylight or towards a spotlight if it were focused on the object of interest. In color photography, a more sophisticated type of "light meter" called a photo spectroradiometer is used. Rather than measuring a single quantity like the black and white light meter, a photo spectroradiometer has to measure numerous points across the visual light spectrum and make a graph of the power at each wavelength that it has found. Once this graph is known, then an accurate representation of the original image can be constructed by removing the influence of the light source from the original scene. For example, an image of a white tee shirt at sunset will have a definite red cast to it. The photo spectroradiometer graph will show strong photon power in the red region of the visible spectrum. Knowing how much influence the illumination source had on the resulting image, a mathematical process is performed to remove the dominant red from the image. The final image has the white tee shirt looking truly white. In the other example of the red barn with the blue and green signs, the photo spectroradiometer graph would show normal daylight present as the illuminant. This means that almost no color correction would be applied to the final image. So in this case the dominant red barn color would be left in the image since that is the normal color that human vision would have seen under midday circumstances. The photo spectroradiometer is the ideal instrument for taking color pictures.

The problem is that a spectroradiometer is both big and expensive. A typical unit is 10 by 6 by 4 inches in size and costs between $5000 to $50,000 in 1998 dollars. It also requires a computer to readout its graphical data and apply it to the image in question. What has long been needed is a low-cost, small, portable spectroradiometer to indicate the type of illumination present while a picture is being captured.

The high cost of spectroradiometers comes from the narrow bandwidth samples (typically ten nanometers in width) that they provide. Narrow bandwidth measurements are essential for scientific calculations, but while working on the present invention it has been determined that they are not required for illumination discrimination.

DISCLOSURE OF THE INVENTION

The present invention provides an optical sensor system which uses portions of the intensity spectrums of various types of natural and artificial light and combinations thereof to determine the nature of the illuminants. The intensity spectrums are sensed by a plurality of photosensors connecting to a processing system which can discriminate characteristic areas therein. The present invention measures relative mixtures of sunlight, and artificial light, such as tungsten, fluorescent, and xenon photoflash.

The present invention further provides a plurality of photosensors having a plurality of bandpass filters which allow discrimination of the sources of illumination, such as natural light, artificial light, and a combination thereof.

The present invention further provides a plurality of photosensors having a plurality of bandpass filters selected to optimize the discrimination ability for various types of illuminants.

The present invention further provides a minimum of five bandpass filters measurements of the spectral power that can resolve daylight, incandescent (tungsten), and florescent light sources.

The present invention further provides a plurality of photosensors having a diffraction grating which allows discrimination of the sources of illumination, such as natural light, artificial light, and a combination thereof.

The present invention further provides a plurality of photosensors having a diffraction grating selected to optimize the discrimination ability for various types of illuminants.

The present invention further provides a computer program for selecting bandpass filters to optimize the discrimination ability thereof.

The present invention further provides a computer program for selecting dye-based bandpass filters with maximum discrimination ability for minimal cost.

The above and additional advantages of the present invention will become apparent to those skilled in the art from a reading of the following detailed description when take[008e] in conjunction with the accompanying drawings.

BEST MODE FOR CARRYING OUT THE INVENTION

Figure 1:
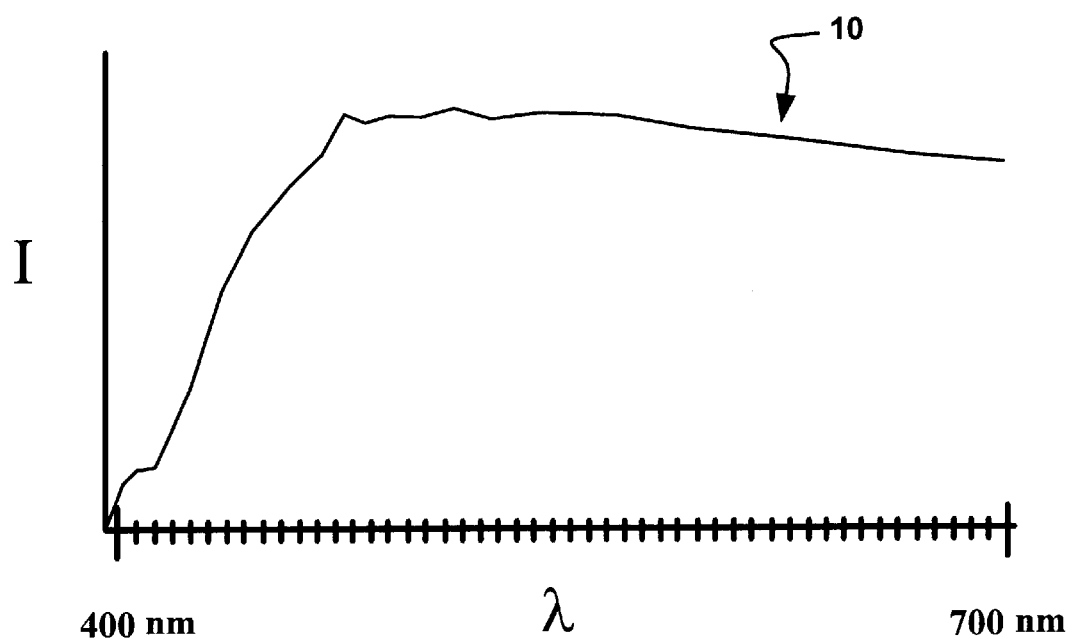
FIG. 1 (PRIOR ART) is an intensity spectrum of natural light.

Referring now to FIG. 1 (PRIOR ART), therein is shown an intensity spectrum of natural light. The intensity spectrum plots the intensity on the ordinate axis and the wavelength on the abscissa. The visible portion of the spectrum shown is generally from 400 to 700 nanometers. The curve 10 is typical of mid-day sunlight. During the course of the day, the general configuration of the curve representing natural light will remain the same although the intensity of different wavelengths will change based on the time of day. For example, the sunlight will be redder at the beginning and end of the day such that the intensity at the red, 700 nanometer end of the spectrum will be higher at those times. Similarly, for a cloud-covered day with indirect sunlight, the entire intensity spectrum would be reduced.

Figure 2:
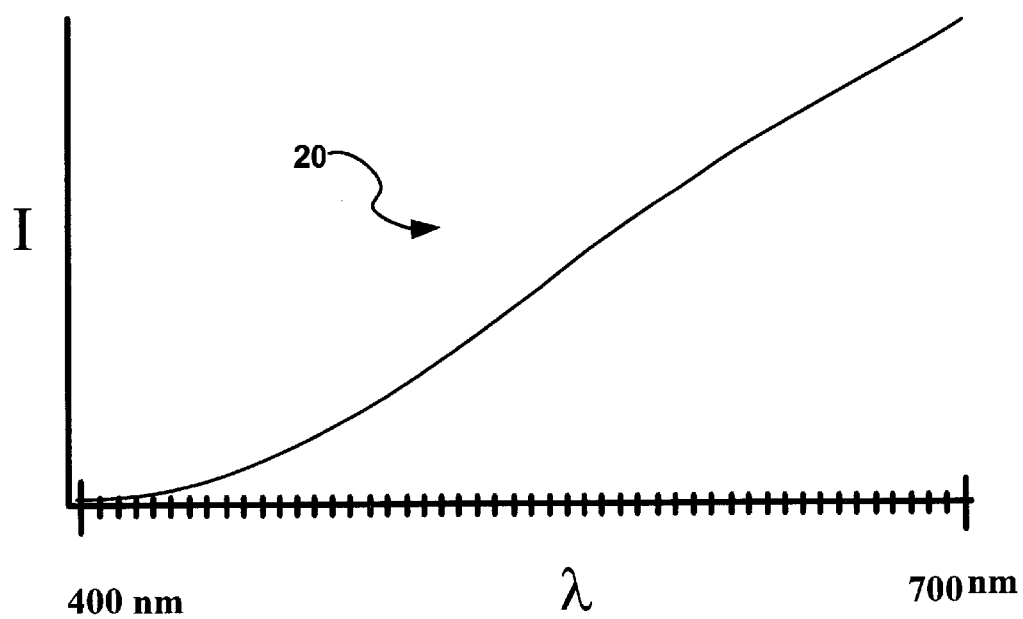
FIG. 2 (PRIOR ART) is an intensity spectrum of typical of incandescent light.

Referring now to FIG. 2 (PRIOR ART), therein is shown an intensity spectrum for incandescent light, such as tungsten filament or halogen. The curve 20 represents light from a tungsten filament. The curve will remain generally the same except the intensity levels will be different based on the current feeding the tungsten filament.

Figure 3:
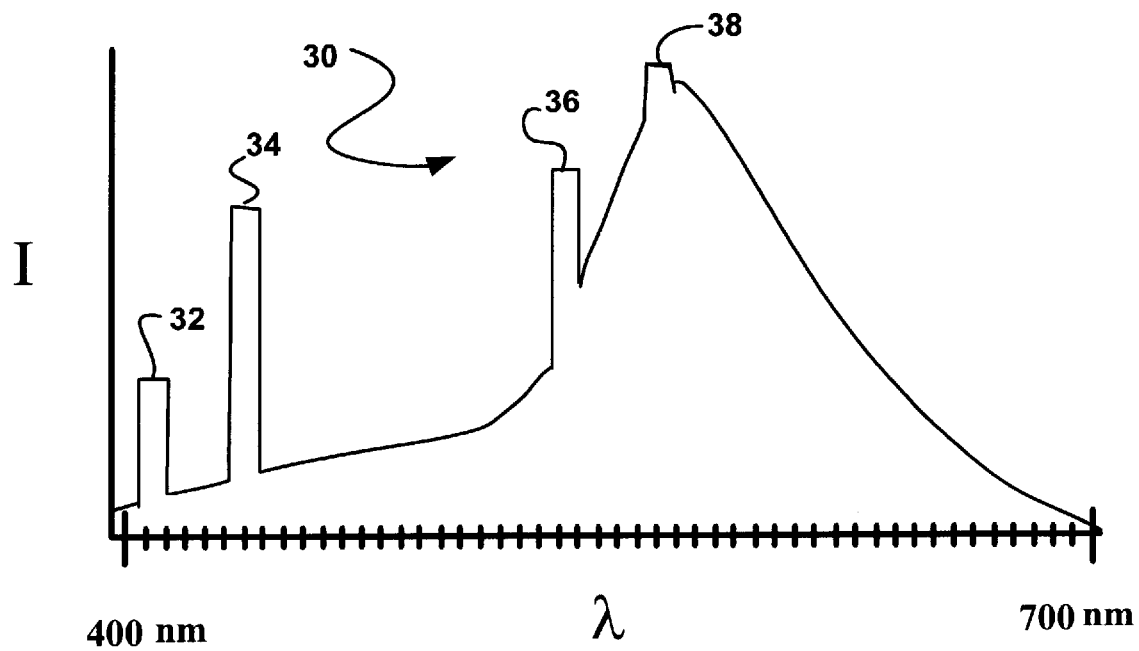
FIG. 3 (PRIOR ART) is an intensity spectrum of one type of fluorescent light.

Referring now to FIG. 3 (PRIOR ART), therein is shown an intensity spectrum for a gaseous-discharge light, such as fluorescent, mercury vapor, metal halide, sodium, or neon. The curve 30 shows a standard warm white fluorescent light spectrum having spikes 32, 34, 36, and 38 which are characteristic of the electron excitation levels of the phosphors used in fluorescent lights. It should be noted as well know to those skilled in the art that the spikes shown have been truncated to show relative intensities since the spikes are narrow and would be off scale for the intensity spectrum shown.

Figure 4:
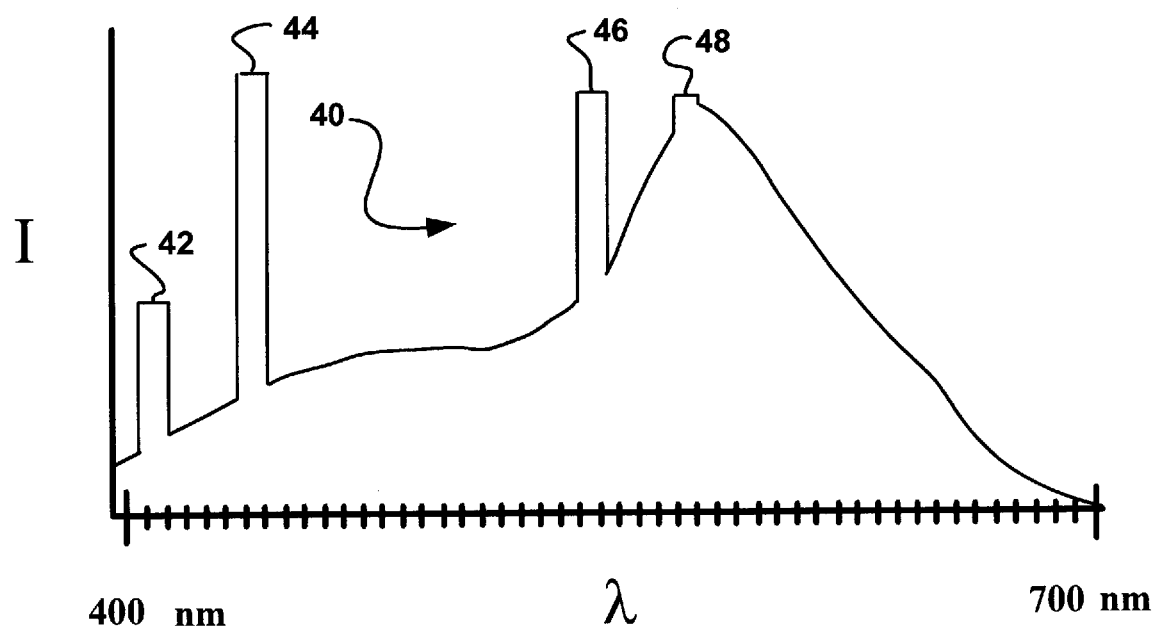
FIG. 4 (PRIOR ART) is an intensity spectrum of another type of fluorescent light.

Referring now to FIG. 4 (PRIOR ART), therein is shown the intensity spectrum of another fluorescent light. The curve 40 is for a standard cool white fluorescent light having the characteristic spikes at 40, 44, 46, and 48. It should be noted that while the general curves 40 and 30 are similar, the intensities of the spikes are different, and this allows for distinguishing between these two fluorescents. It should be understood that there are a number of different types of fluorescent lights, but they all have different individual intensity spectrum characteristics.

Figure 5:
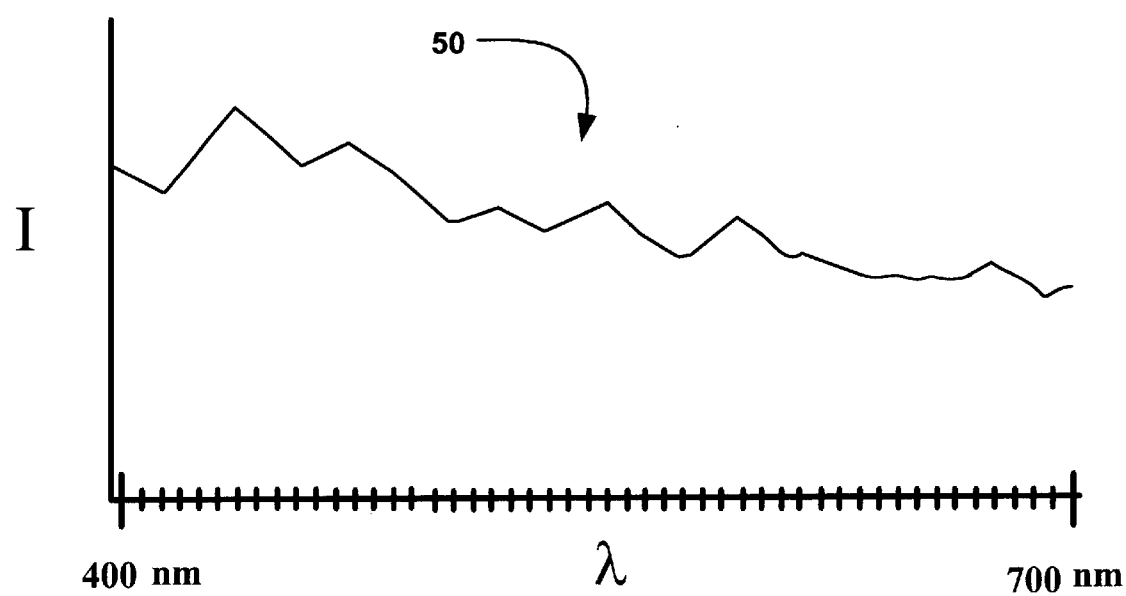
FIG. 5 (PRIOR ART) is an intensity spectrum of xenon light.

Referring now to FIG. 5 (PRIOR ART), therein is shown the intensity spectrum of xenon light. The curve 50 represents the typical spectrum of xenon light used in photographic flash equipment.

Figure 6:
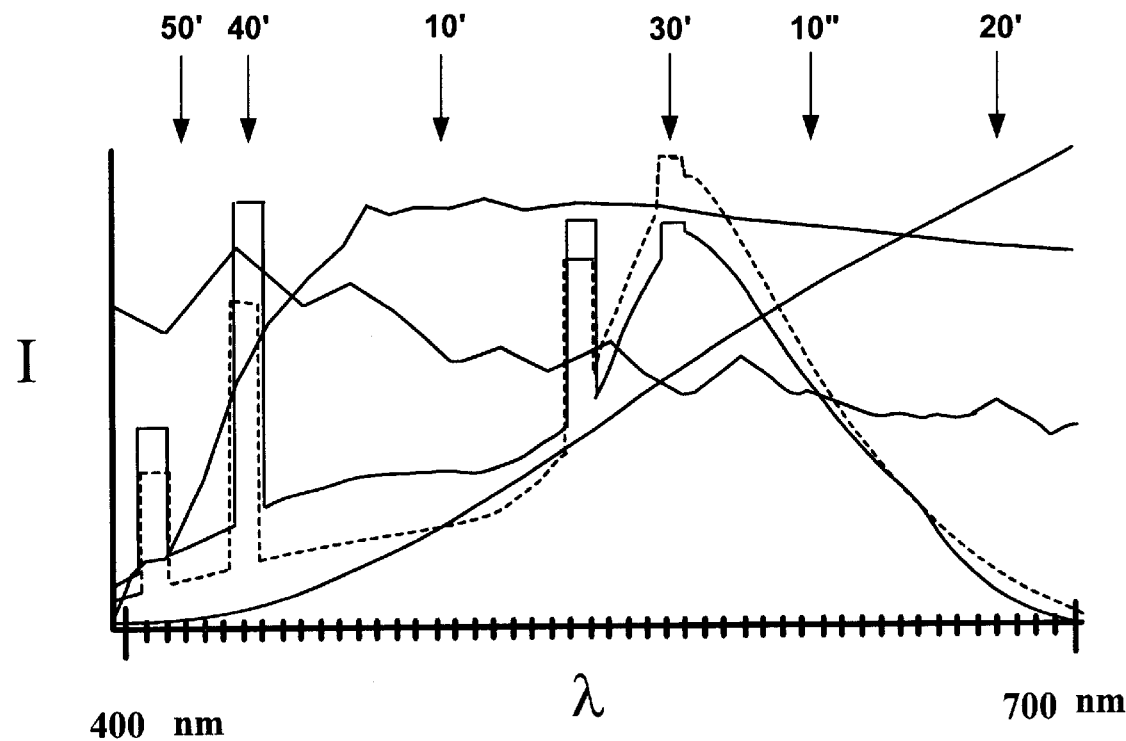
FIG. 6 (PRIOR ART) are the intensity spectrums of FIGS. 1 through 5 (PRIOR ART) combined.

Referring now to FIG. 6 (PRIOR ART), therein are shown an overlay of curves 10, 20, 30, 40, and 50 from FIG. 1 (PRIOR ART) through FIG. 5 (PRIOR ART). It should be noted that there are characteristic areas 10', 20', 30', 40', and 50' where each of the light sources is different from that of all the others and therefore it would be possible to discriminate between them when the spectral intensity curves are known. Some light sources such as natural light can be distinguished between time of day and cloud cover by having two or more characteristic areas such as 10' and 10".

Figure 7:
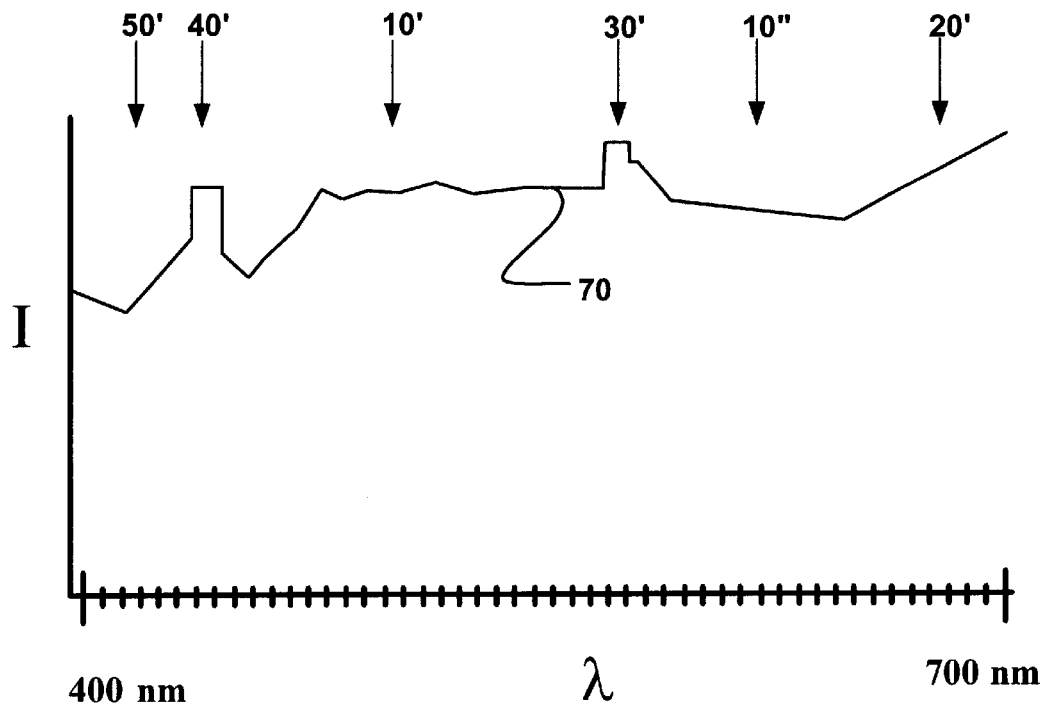
FIG. 7 is a composite light spectrum according to the present invention.

Referring now to FIG. 7, therein is shown a composite intensity spectrum with a curve 70 along with characteristic areas 10', 20', 30', 40', 50', and 10". This curve 70 is the outline composite of FIG. 6 (PRIOR ART), and it can be used in the bandpass filter selection program of the present invention as will later be described.

Figure 8:
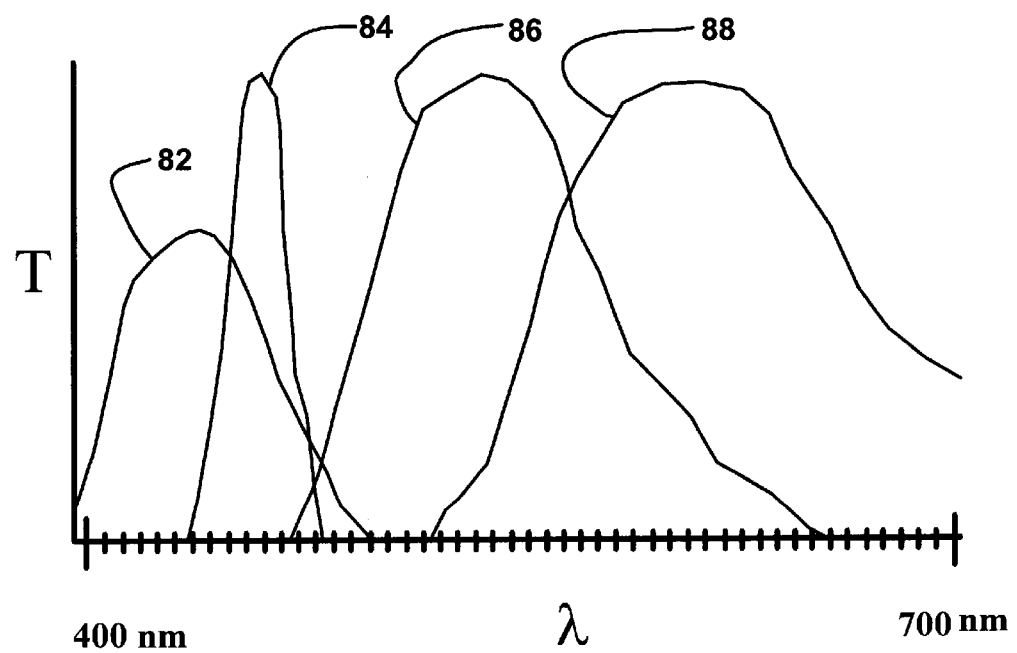
FIG. 8 is an intensity spectrum of four bandpass filters.

Referring now to FIG. 8, therein is shown the spectral intensity characteristics of a series of manually selected bandpass filters 82, 84, 86, and 88. The percent transmittance is shown on the ordinate axis. These filters were selected to see if it was possible to cover the entire spectrum from 400 to 700 nanometers while having different bandpasses and transmittance which would allow photosensors to detect specific characteristic bandwidths and intensities in illumination light.

Figure 9:
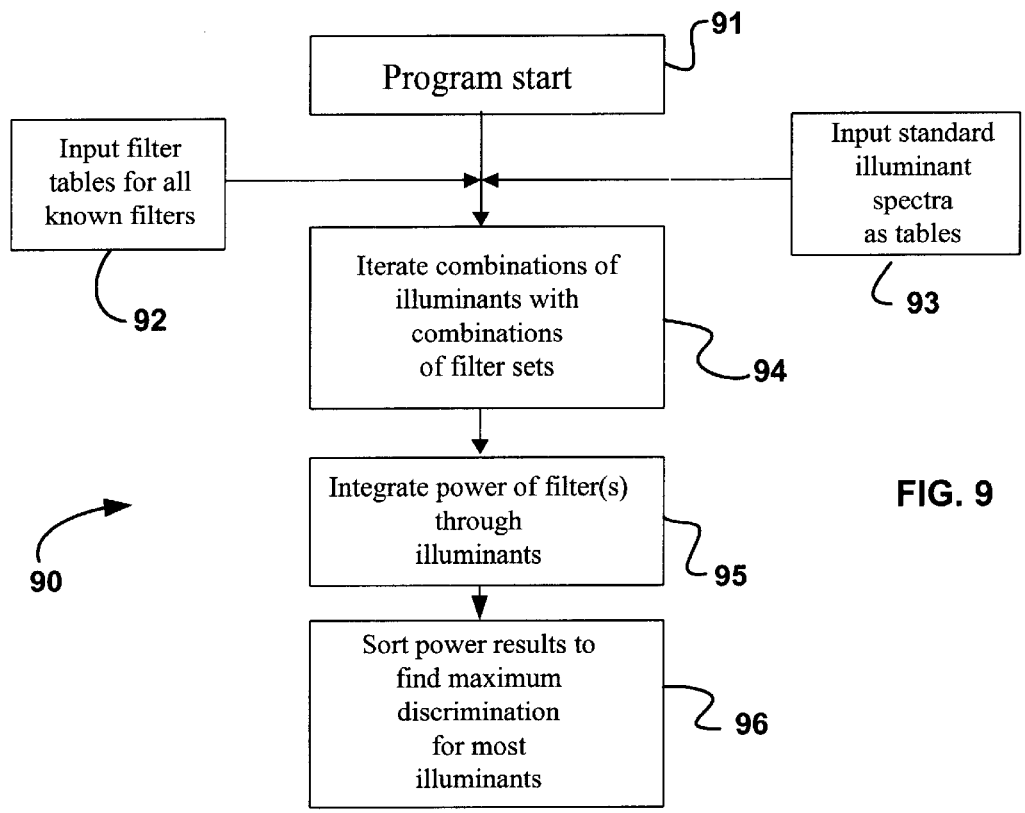
FIG. 9 is a bandpass filter selection program in accordance with the present invention.

Referring now to FIG. 9, therein is shown the bandpass filter selection program 90 of the present invention. The program 90 starts at block 91 with input 92 where the filter tables for all known filters and new filters are input. The advance of commercial optical band pass filters materials continues, and so new and improved filters are available on an ongoing basis.

The computer program 90 of the present invention provides a method of choosing the best bandpass filters currently available and minimizing the number of photosensors needed to produce a maximum discrimination of the various light source illuminants.

The program starts at a block 91. At a block 92, the bandpass filter tables are input. At a block 93, standard illuminant spectra are input as tables. In a block 94, all the combinations of illuminants with combinations of filter sets are iterated. In a block 95 connected to the output of the block 94, the program integrates the power of the filters through the illuminants for the combinations of filter sets. And, in a block 96, the power results are sorted to find the maximum discrimination for the most number of illuminants.

Figure 10:
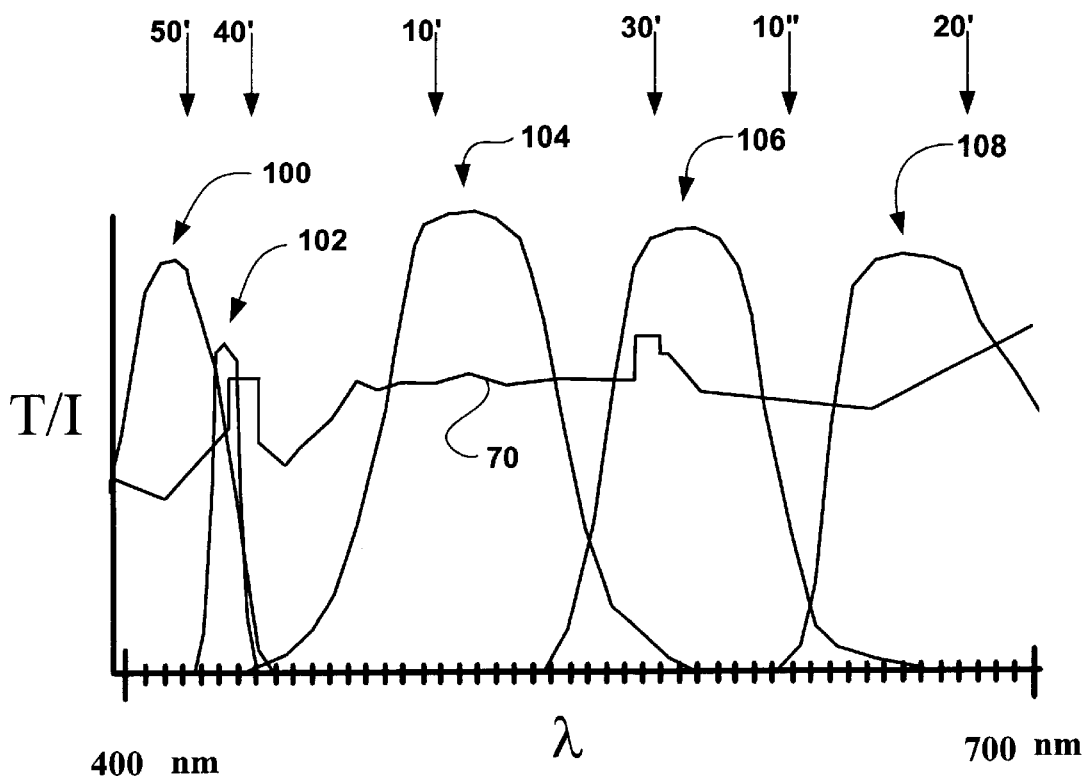
FIG. 10 is an intensity spectrum of five bandpass filters selected by the bandpass filter selection program of FIG. 9.

Referring now to FIG. 10, therein are shown five bandpass filters 100, 102, 104, 106, and 108, selected using the program 10, which would respectively permit the identification of illuminants having the distinctive characteristics areas 50', 40', 10', 30', and 20'respectively.

Figure 11:
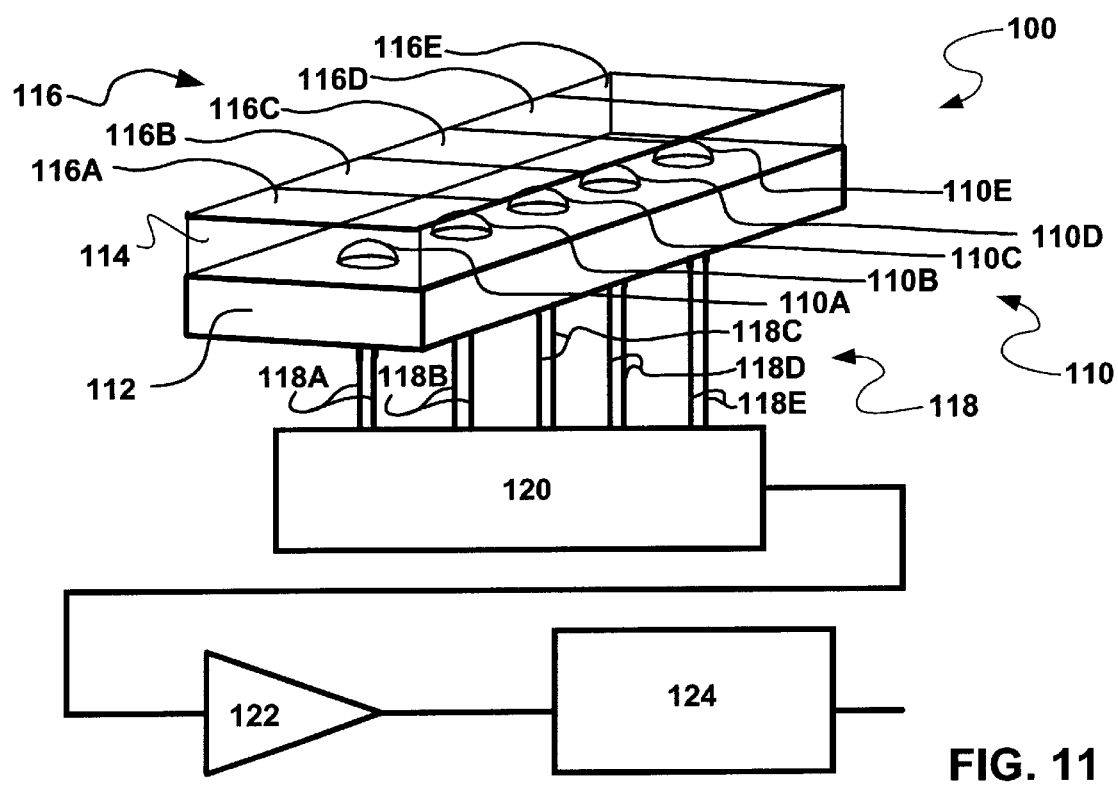
FIG. 11 is an optical sensor system of the present invention resulting from the bandpass filter selection program of FIG. 9.

Referring now to FIG. 11, therein is shown a bandpass filter optical sensor system 100. The optical sensor system 100 has a plurality of photosensors 110 consisting of photosensors 110A through E which are mounted on a frame 112. The photosensors 110 can be discrete photodiodes, photosensitive semiconductors, or charge-coupled devices which produce or affect the passage of current proportionally to the light energy to which it is exposed. On top of the, frame 112 is a transparent resin 114 which has been flattened to allow the deposition of various dye-based bandpass filters 116 consisting of bandpass filters 116A through 116E. The bandpass filters 116 are a selection structure for selecting the desired portions of the intensity spectrum of illuminants for intensity determinations by the photosensors 110.

The photosensors 110A through E are respectively connected by leads 118A through E to a sample-and-hold circuit 120. The signals from the sample-and-hold circuit 120 are provided as signals to an analog-to-digital (A/D) converter 122 and the digital signals therefrom are provided to an application specific integrated circuit (ASIC) 124. The ASIC 124 is a specialized circuit for distinguishing from the signals which illuminants are predominant. However, it could also be a simple microprocessor or other processing engine.

Figure 12:
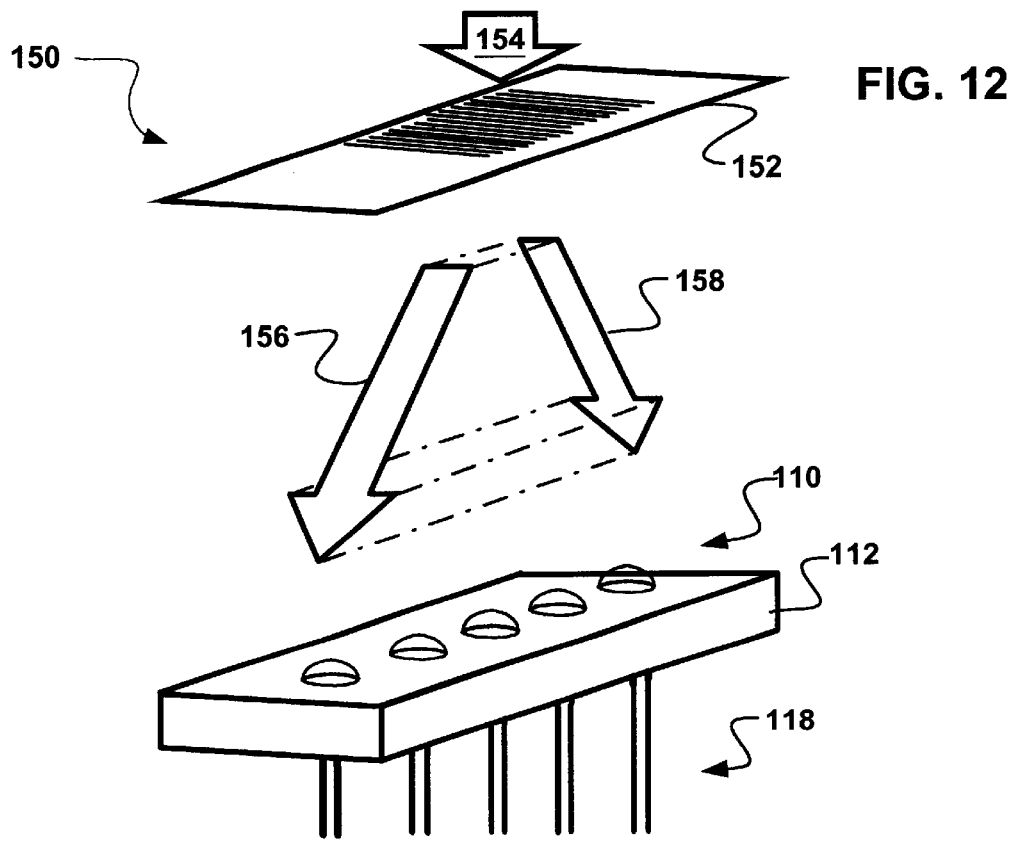
FIG. 12 is an alternate optical sensor system according to the present invention resulting from a modified version of the bandpass filter selection program of FIG. 9.

Referring now to FIG. 12, therein is shown a portion of a diffraction grating optical sensor system 150. The optical sensor system 150 includes photosensors 110A through E and the leads 118A through E which are similar to the bandpass optical sensor system 100 components.

The number and spacing of the photosensors 110 A through E would be determined using the computer program 10.

Spaced apart from the photosensors 110 is a diffraction grating 152. The diffraction grating is a selection structure for selecting the desired portions of the intensity spectrum of illuminants for intensity determinations by the photosensors 110. It takes incoming light 154 and diffracts it into its spectrum as indicated by arrows 156 and 158. This provides the intensity spectrum of FIG. 7 onto the photosensors 110A through E. The ASIC 124 for the diffraction grating optical sensor system 150 would then be set up to perform the discrimination function.

In operation, the present invention uses the computer program 10 to integrate the signals that are derived from the photosensors 110 with their respective bandpass filters over them in response to various mixtures of illuminants. By comparing the signal from the photosensors with others which sample different regions of the visible spectrum, a determination of the relative strength of the various mixtures of illuminants is made.

During the initial investigations, it was determined that it would be possible to select four bandpass dye-based filters such as 82, 84, 86, and 88 which would cover the entire visible spectrum from 400 to 700 nanometers and have the ability to be specifically tailored to detect specific characteristics of the light spectra of various illuminants. For example, the bandpass 84 in FIG. 8 would be particularly adept at identifying the spike 40' in FIG. 6 which is characteristic of the standard cool white florescent shown in FIG. 4 (PRIOR ART).

Since new optical bandpass materials continue to be developed on an ongoing basis, it is not feasible to manually test different materials and try to judge their relative cost. Further, there is a four-way trade-off between the discrimination capability of the bandpass filter material, its cost and the number of photosensors 110 required, and the combined number of illuminants which will affect the white point. The goal of the computer program 10 is to position all classes of commercially available bandpass filters on typical mixed illuminant spectra to find the combination of filters which gives the maximum signal of parts of the spectra that are characteristic of a particulate type of illuminant at minimal cost.

It has generally been determined that at least three, and optimally between five and seven photosensors 110 are required within an equivalent number of bandpass filters.

Similarly, the diffraction grating 152 will diffract incoming illumination into its spectral components with the higher intensities at the characteristic illumination spectrum regions for the particular illuminant. Therefore, the diffraction grating 152 can be used in place of the bandpass filters 116. However, the diffraction grating optical sensor system 150 is more susceptible to placement problems ranging from the distance of the diffraction grating from the photosensors 110 and of the spacing of the photosensors 110 between each other since movement in either would displace the position of the spectra falling thereon. Further, because of the spacing requirement, such a diffraction grating optical sensor system 150 would be larger than the equivalent band pass optical sensor system 100.

The computer program 10 is capable of determining an ideal number of bandpass filters for detecting various types of natural and artificial light illuminants using the composite light curve 70 shown in FIG. 7. The computer program 10 would select a series of bandpass filters such as bandpass filters 100, 102, 104, 106, and 108 as shown in FIG. 10. This would allow discrimination of the illuminant characteristic areas 50', 40', 10', 30', 10", and 20' as shown in FIG. 10 by the super position of the curve 70. Generally, it would be understood that most situations where lighting is critical would generally would be controlled by only one to three illuminates and therefore, the capability of detecting all illuminants all of the time is not necessary. It would also be understood that, depending on the circumstances, illuminants having intensities below a certain level need not be considered.

After selecting the number of bandpass filters and photosensors 110 necessary or desirable for a particular application, the optical sensor system 100 shown in FIG. 11 would be built.

The photosensors 110A through E would be placed in a frame 112 and clear resin fabricated over the photosensors 110 in such a way that the resin has a flat surface. Since most dye band pass filters come in the form of a paint or gel, they can be applied to the clear resin 114 by painting, silkscreen, or printing on them on in several layers for increased optical density. This inexpensively forms the bandpass filters 116A through E respectively above the photosensors 110A through E.

It would be evident to those skilled in the art that the lowest cost photosensors 110 can be obtained when the bandpass filters can be silk-screened or printed directly on the silicon substrate in which the photosensors 110 have been manufactured by conventional semiconductor manufacturing technology. This approach would eliminate the transparent resin 114 and the frame 112, and allow the optical sensor system 100 to be only microns in size. It would also allow it to be integrated into devices which already have photosensors.

As previously explained, various intensity levels of the light impacting on the photosensors 110 A through E would generate or allow the passage of current to the sample and hold 120 where the signals would be fed to the A/D converter 122 for use by the ASIC 124 which would identify the individual illuminants and their percentages due to the spectrums and the intensities which are a function of the signals on leads 118 A through E.

In the alternate embodiment of FIG. 12, the diffraction grating optical sensor system 158 consists of the same or similar photosensor and electronic system as shown in FIG. 11. The way that the intensity spectrum is generated is different. The diffraction grating 152 is used to take the mixed illuminant light 154 and divide it into its spectral components 156 through 158 which the diffraction grating optical sensor system 150 is capable of analyzing in the same way as for the bandpass filter optical sensor system 100 of FIG. 11.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. An optical sensor system comprising:
   a plurality of photosensors for providing a plurality of outputs proportional to the light energy applied thereto;
   a resin disposed over said plurality of photosensors to form a flat surface;
   a dye disposed on said flat surface by a process selected from a group consisting of silk-screening, printing, painting, and a combination thereof in a form selected from a group consisting of paint, gel, ink, and a combination thereof, said dye for each of said plurality of photosensors, each of said dyes selected for the discrimination ability of the bandpass spectrum thereof for portions of the spectrums of illumination selected from a group consisting of:
   daylight,
   afternoon light,
   fluorescent,
   incandescent,
   photoflash, and
   combination thereof;
   a processing system responsive to said plurality of outputs to determine the presence of light energy attributable to illumination from the:
   daylight,
   afternoon light,
   fluorescent
   incandescent,
   photoflash, and
   combination thereof.

2. The optical sensor system as claimed in claim 1 wherein:
   said dye has been selected for cost by:
     developing a composite illumination light curve using portions of the spectrums of illumination selected from a group consisting of the:
     daylight,
     afternoon light,
     fluorescent,
     incandescent,
     photoflash, and
     combination thereof;
     developing a composite bandpass spectrum using bandpass spectrums of a plurality of preselected bandpass filters;
     integrating the bandpass spectrum of a new bandpass filter having with said bandpass spectrums of said preselected bandpass filters to form a composite bandpass spectrum;
     comparing said bandpass spectrum with said composite illumination light curve to determine the discrimination ability of said bandpass spectrum for said composite illumination light curve;
     providing the costs of each of said plurality of preselected dyes; providing the cost of said new dye;
     changing said plurality of preselected dyes and the composite bandpass spectrum in accordance therewith; and
     comparing said composite bandpass spectrum with said composite illumination curve to maximize the discrimination ability of said plurality of dyes and said new dye for said composite bandpass spectrum for said composite illumination light curve at the lowest cost.

3. The optical sensor system as claimed in claim 1 wherein:
   said processing system includes a microprocessor for determining the percentages of a predetermined number of illuminations the combination of illuminations.

4. The optical sensor system as claimed in claim 1 wherein:
   said processing system includes a microprocessor for outputting signals indicative of determining the percentages of fewer than three illuminations of the combination of illuminations.

5. The optical sensor system as claimed in claim 1 wherein:
   said plurality of photosensors is from three to eight in number.

6. The optical sensor system as claimed in claim 1 wherein:
   the number of said plurality of photosensous has been determined by:
      providing the costs associated with electronic components required to be used in said optical sensor system with each of said plurality of preselected dyes;
      providing the cost of said new dye and the costs associated with electronic components required to be used in said optical sensor system with said new dye;
      changing said plurality of preselected dyes and the composite bandpass spectrum in accordance therewith; and
      comparing said composite bandpass spectrum with said composite illumination curve to maximize the discrimination ability of said composite bandpass spectrum for said composite illumination light curve for the lowest cost optical sensor system with the fewest of said plurality of photosensors.

7. A method for developing an optical sensor system comprising the steps of:
   developing a composite illumination light curve using portions of the spectrums of illumination selected from a group consisting of natural light, artificial light, and a combination thereof;
   developing a composite bandpass spectrum using bandpass spectrums of a plurality of preselected bandpass filters;
   integrating the bandpass spectrum of a new bandpass filter with said bandpass spectrums of said preselected bandpass filters to form a composite bandpass spectrum; and
   comparing said bandpass spectrum with said composite illumination light curve to determine the discrimination ability of said plurality of preselected bandpass filters and said new bandpass filter with the composite bandpass spectrum for said composite illumination light curve.

8. The method as claimed in claim 7 including the steps of:
   providing the costs of each of said plurality of preselected bandpass filters;
   providing the cost of said new bandpass filter;
   changing said plurality of preselected bandpass filters and the composite bandpass spectrum in accordance therewith; and
   comparing said composite bandpass spectrum with said composite illumination curve to maximize the discrimination ability of said composite bandpass spectrum for said composite illumination light curve at the lowest cost.

9. The method as claimed in claim 7 including the steps of:
   providing the costs associated with electronic components required to be used in an optical sensor system with each of said plurality of preselected bandpass filters;
   providing the cost of said new bandpass filter and the costs associated with electronic components required to be used in the optical sensor system with said new bandpass filter;
   changing said plurality of preselected bandpass filters and the composite bandpass spectrum in accordance therewith; and
   comparing said composite bandpass spectrum with said composite illumination curve to maximize the discrimination ability of said composite bandpass spectrum for said composite illumination light curve for the lowest cost optical sensor system.

10. The method as claimed in claim 7 wherein the step of:
    integrating the bandpass spectrum of a new bandpass filter includes replacing the bandpass spectrum of one said plurality of preselected bandpass filters with the bandpass spectrum of said new bandpass filter.

11. The method as claimed in claim 7 wherein the step of:
    integrating the bandpass spectrum of a new bandpass filter includes adding the bandpass spectrum of said new bandpass filter to the bandpass spectrum of said plurality of preselected bandpass filters.

12. A method for developing an optical sensor system comprising the steps of:
    developing a composite illumination light curve using portions of the spectrums of illumination selected from a group consisting of:
       daylight,
       afternoon light,
       fluorescent,
       incandescent,
       photoflash, and
       a combination thereof;
    developing a composite bandpass spectrum using bandpass spectrums of a plurality of preselected dyes;
    integrating the bandpass spectrum of a new dye with said bandpass spectrums of said preselected dyes to form a composite bandpass spectrum; and
    comparing said bandpass spectrum with said composite illumination light curve to determine the discrimination ability of said plurality of dyes and said new dye with the composite bandpass spectrum for said composite illumination light curve.

13. The method as claimed in claim 12 including the steps of:
    providing the costs of each of said plurality of preselected dyes;
    providing the cost of said new dye;
    changing said plurality of preselected dyes and the composite bandpass spectrum in accordance therewith; and
    comparing said composite bandpass spectrum with said composite illumination curve to maximize the discrimination ability of said composite bandpass spectrum for said composite illumination light curve at the lowest cost.

14. The method as claimed in claim 12 including the steps of:
    providing the costs associated with electronic components required to be used in an optical sensor system with each of said plurality of preselected dyes;
    providing the cost of said new dye and the costs associated with electronic components required to be used in the optical sensor system with said new dye;
    changing the number of said plurality of preselected dyes and the composite bandpass spectrum and the number of electronic components in accordance therewith; and
    comparing said composite bandpass spectrum with said composite illumination curve to maximize the discrimination ability of said composite bandpass spectrum for said composite illumination light curve for the lowest cost optical sensor system.

15. The method as claimed in claim 12 wherein the step of:
    integrating the bandpass spectrum of a new dye includes replacing the bandpass spectrum of one said plurality of preselected dyes with the bandpass spectrum of said new dye and the electronic components therewith.

16. The method as claimed in claim 12 wherein the step of:

combining the bandpass spectrum of a new dye includes adding the bandpass spectrum of said new dye to the bandpass spectrum of said plurality of preselected dyes and the electronic components therewith.

17. An optical sensor system comprising:

a plurality of photosensors for providing a plurality of outputs proportional to the light energy applied thereto;

a resin disposed over said plurality of photosensors to form a flat surface; and a dye for each of said plurality of photosensors disposed on said flat surface by a process selected from a group consisting of silk-screening, printing, painting, and a combination thereof in a form selected from a group consisting of paint, gel, ink, and a combination thereof, each of said dyes selected for the discrimination ability of the bandpass spectrum thereof for portions of the spectrums of illumination selected from a group consisting of:

daylight,
afternoon light,
fluorescent,
incandescent,
photoflash, and
a combination thereof; and a processing system responsive to said plurality of outputs to determine the presence of light energy attributable to illumination from the:

daylight,
afternoon light,
fluorescent,
incandescent,
photoflash, and
combination thereof.

* * * * *

UNITED STATES PATENT AND TRADEMARK OFFICE
CERTIFICATE OF CORRECTION

PATENT NO. : 6,441,903 B1
DATED : August 27, 2002
INVENTOR(S) : Cooper

It is certified that error appears in the above-identified patent and that said Letters Patent is hereby corrected as shown below:

Column 1,
Line 64, please delete "WIP" and insert therefore -- WP --.

Column 2,
Line 14, please delete "WVv" and insert therefore -- WP --.

Signed and Sealed this

Fifth Day of November, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,441,903 B1
DATED : August 27, 2002
INVENTOR(S) : Cooper

It is certified that error appears in the above-identified patent and that said Letters Patent is hereby corrected as shown below:

Column 1,
Line 64, please delete "WIP" and insert therefore -- WP --.

Column 2,
Line 14, please delete "WVv" and insert therefore -- WP --.

Signed and Sealed this

Twenty-eighth Day of January, 2003

JAMES E. ROGAN
*Director of the United States Patent and Trademark Office*